United States Patent [19]
Davis et al.

[11] Patent Number: 5,296,172
[45] Date of Patent: Mar. 22, 1994

[54] ELECTROSTATIC FIELD ENHANCING PROCESS AND APPARATUS FOR IMPROVED WEB PINNING

[75] Inventors: Michael C. Davis, Richmond; Michael A. Bryner, Midlothian, both of Va.

[73] Assignee: E. I. du Pont de Nemours and Company, Wilmington, Del.

[21] Appl. No.: 922,658

[22] Filed: Jul. 31, 1992

[51] Int. Cl.$^5$ .................. B29C 47/00; B29C 71/04
[52] U.S. Cl. ........................... 264/24; 264/205; 264/211.14; 425/72.2; 425/174.8 E; 425/224
[58] Field of Search .............. 264/22, 24, 205, 211.14; 425/72.2, 174.8 E, 224

[56] References Cited
U.S. PATENT DOCUMENTS

| | | | |
|---|---|---|---|
| 3,169,899 | 2/1965 | Steuber | 428/198 |
| 3,319,309 | 5/1967 | Owens | 28/103 |
| 3,578,739 | 5/1971 | George | 425/72.2 |
| 3,689,608 | 9/1972 | Hollberg et al. | 264/24 |
| 3,851,023 | 11/1974 | Brethaurer et al. | 264/24 |
| 3,860,369 | 1/1975 | Brethaurer et al. | 425/3 |

Primary Examiner—Leo B. Tentoni

[57] ABSTRACT

Process and apparatus for improving web pinning and uniformity in a fibrous web forming operation. The improvements are achieved by imposing an auxiliary electrostatic field above the fibrous web as it is pinned along a moving collection surface. An auxiliary electrostatic field enhancing plate is positioned above the web and collection surface and downstream of the laydown position where the web initially is deposited on the collection surface. The plate enhances the electrostatic field in the region above the collection surface and thereby increases the web pinning forces. When the invention is applied to a flash-spinning process where trifluorochloromethane is used as the fluid medium, an auxiliary electrostatic field of between about 2 and 80 kV/cm, preferably between about 10 and 60 kV/cm, is applied by the plate.

10 Claims, 4 Drawing Sheets

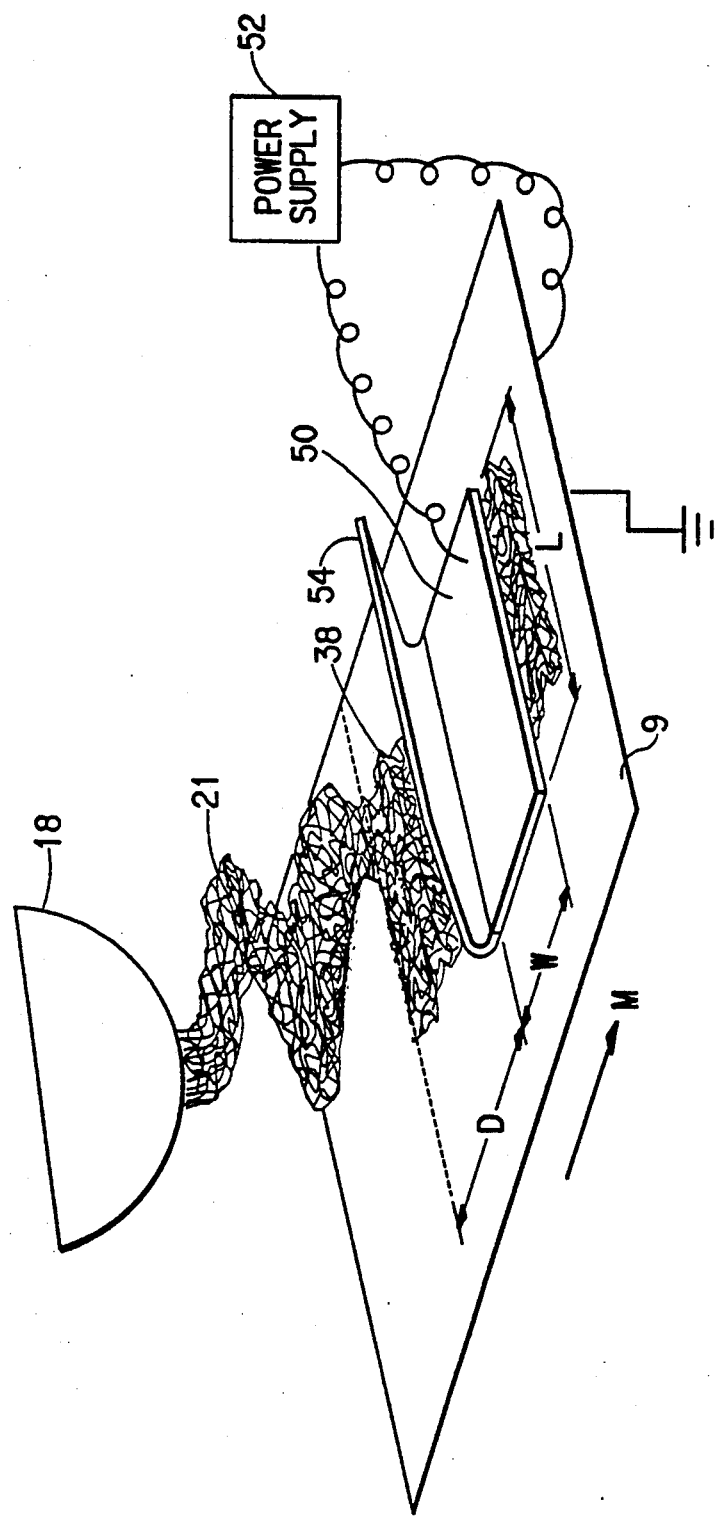

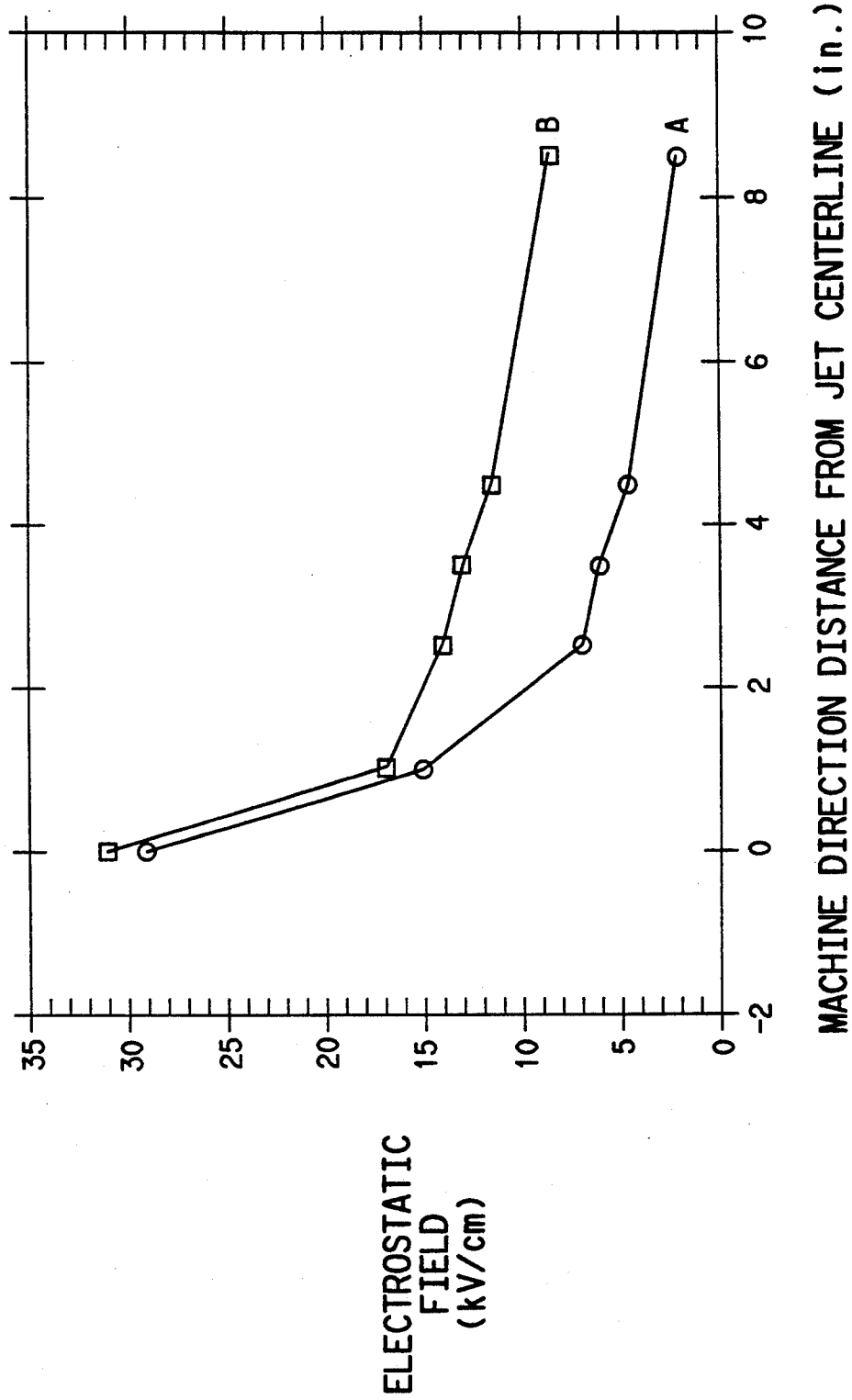

ELECTROSTATIC FIELD ENHANCING PROCESS AND APPARATUS FOR IMPROVED WEB PINNING

FIELD OF THE INVENTION

The present invention relates to a process and apparatus for improving pinning and uniformity of a fibrous web as it is being deposited on a moving collection surface. In particular, the invention relates to positioning an electrostatic field enhancing plate above the collection surface and downstream of the position where the web is deposited on the collection surface to enhance the electrostatic field and pinning forces in the region above the collection surface.

BACKGROUND OF THE INVENTION

U.S. Pat. No. 3,169,899 (Steuber) describes a process for flash-spinning plexifilaments, and laying those plexifilaments down on a moving receiver or collection surface to form a nonwoven fibrous web. One element of the Steuber equipment comprises an electrostatic device (i.e., a target plate and ion gun plexifilamentary strand to the moving receiver (e.g., a conveyor belt).

U.S. Pat. No. 3,689,608 (Hollberg et al.) discusses the need for improvements in the Steuber process to provide a high degree of dispersion and uniformity in sheets destined for certain uses, and notes that the requirements for aerodynamic stability of the fine fibril network and the requirements for uniform electrostatic charging are somewhat in opposition to each other. Hollberg et al. note further that there are two requirements for effective charging; a high density of ions of a single polarity and a high electric field intensity in the vicinity of the fibers. Hollberg et al. suggest operating at 75 to 100 percent of the maximum sustainable charge for the web.

U.S. Pat. Nos. 3,851,023 and 3,860,369 (both to Brethauer et al.) describe a further improvement in the Steuber process wherein an aerodynamic shield is added to provide an equal impedance flow path independent of the initial radial direction at which the web leaves the spinning orifice.

While the Hollberg et al. process and apparatus, as improved by Brethauer et al., operated satisfactorily at slower spinning and laydown speeds, it has been discovered that as the throughput per position and the moving collection surface (e.g., conveyor belt) speed increase, plexifilament dispersion and subsequent sheet uniformity deteriorate. Attraction and adhesion of the plexifilaments to the collection surface, collectively called pinning, become less satisfactory.

Moreover, as spinning throughput increases, gas jet velocity and volume between adjacent spin positions increase. The gas flow causes increased turbulence and greater plexifilament "dancing" which tend to overcome the electrostatic attraction of the charged plexifilaments to the grounded collection surface. In addition, increased belt speed creates aerodynamic forces which attempt to pull the web along the collection surface. If the aerodynamic forces from the spinning jet and the collection surface movement are strong enough, they will collapse the plexifilamentary web, create ropes or other defects, and form a sheet of inferior uniformity. Under some commercially practical conditions, the drag forces and the pinning forces may reach the same order of magnitude.

The straightforward solution to the problem of increasing the electrostatic charge on the plexifilaments is unsatisfactory, since the charge on the plexifilaments is already at 75-100% of the peak charge. Additional charge from the ion gun would result in secondary ionization and loss of charge on the web. Secondary ionization is characterized by a glow discharge at the trailing edge of the target plate between the target plate and the plexifilaments as the plexifilaments leave the target plate. Moreover, secondary ionization is characterized by arcs from the charged web to the collection surface. Such arcs can cause the plexifilamentary strands to collapse on one another in the form of ropes.

Clearly, what is needed is a process and an apparatus that overcome the deficiences inherent in the prior art. In particular, the process and apparatus should allow for enhancing the electrostatic field and pinning forces in the region above the collection surface. Other objects and advantages of the present invention will become apparent to those skilled in the art upon reference to the attached drawings and to the detailed description of the invention which hereinafter follows.

SUMMARY OF THE INVENTION

According to the invention, a process and an apparatus are provided for enhancing the electrostatic field and pinning forces in the region above a fibrous web as the web is deposited and transported on a moving collection surface. Enhancement is provided by imposing an auxiliary non-corona electrostatic field above the web without such field placing a higher electrostatic charge on the web.

For purposes of the invention, it will be understood that the fibrous web can be formed by any of several fiber-forming processes in which fibers are deposited and collected on a moving collection surface, for example, flash-spinning, spunbonded process or melt-spinning. In particular, the invention is an improvement in the flash-spinning process of U.S. Pat. No. 3,851,023 (Brethauer et al.) and the apparatus of U.S. Pat. No. 3,860,369 (Brethauer et al.).

In a broad sense, the invention relates to a process for forming fibrous webs on a moving collection surface comprising forming polymeric strands in a fluid medium and directing the strands toward a laydown position on the moving collection surface. The strands are electrostatically charged and collected on the collection surface as a fibrous web. The improvement comprises imposing an auxiliary electrostatic field of up to 95% of the electrostatic breakdown strength of the fluid medium above the web and the moving collection surface and downstream of the laydown position where the web is deposited on the collection surface to enhance the electrostatic field in the region above the collection surface.

In a preferred embodiment, the invention relates to a flash-spinning process for forming fibrous sheets on a moving collection surface comprising, as a first step, entraining a fibrous web in a gaseous stream formed from a fluid medium flowing in a generally horizontal path toward one location on a baffle. Thereafter, the web and gaseous stream are directed from said one location in a plurality of downward radial directions in a substantially vertical plane through ambient gas toward a laydown position on the moving collection surface. The web is electrostatically charged and collected on the moving collection surface as a fibrous sheet. The improvement comprises imposing an auxiliary electrostatic field of up to 95% of the electrostatic breakdown strength of the fluid medium above the web and the moving collection surface and downstream of the laydown position where the web is deposited on the collection surface to enhance the electrostatic field in the region above the collection surface.

Non-limiting examples of fluid mediums useful in the invention are represented as follows. In the case of trichlorofluoromethane ("CFC-11") as the fluid medium, the imposed auxiliary electrostatic field should be between about 2 and 80 kV/cm, preferably between about 10 and 60 kV/cm. In the case of a $C_{4-6}$ hydrocarbon as the fluid medium, the imposed auxiliary electrostatic field should be between about 2–50 kV/cm, preferably between about 10–40 kV/cm. In the case of methylene chloride as the fluid medium, the imposed auxiliary electrostatic field should be between about 2 and 35 kV/cm, preferably between about 10 and 30 kV/cm. In the case of air as the fluid medium, the imposed auxiliary electrostatic field should be between about 2 and 30 kV/cm, preferably between about 10 and 25 kV/cm. In the case of 2,2-dichloro-1,1,1-triflouroethane ("HCFC-123") as the fluid medium, the imposed auxiliary electrostatic field should be between about 2–75 kV/cm, preferably between about 10 and 60 kV/cm. In the case of 2-chloro-1,1,1,2-tetraflouroethane ("HCFC-124") as the fluid medium, the imposed auxiliary electrostatic field should be between about 2–45 kV/cm, preferably between about 10 and 40 kV/cm. In the case of pentaflouroethane ("HFC-125") as the fluid medium, the imposed auxiliary electrostatic field should be between about 2–25 kV/cm, preferably between about 10 and 20 kV/cm. It should be understood that the above-identified fluid mediums may be used alone or in combination with each other. In particular, HCFC-124 and HFC-125 cannot be used alone in flash-spinning operations unless excessively high pressures are used, therefore it is preferred that these fluid mediums be used in combination with other fluid mediums (e.g., methylene chloride).

In another embodiment, the invention relates to an apparatus for forming a fibrous web on a moving collection surface comprising means for forming polymeric strands and means for directing the strands toward a laydown position on the moving collection surface. The strands are deposited on the collection surface in the form of a fibrous web. Means for charging the strands are provided and positioned between the forming and directing means and the collection surface. The improvement comprises an auxiliary electrostatic field enhancing plate (i.e., an auxiliary non-corona device) positioned above the web and the moving collection surface and downstream of the laydown position where the web is initially deposited on the collection surface.

In yet another embodiment, the invention relates to an apparatus for forming a flash-spun fibrous web on a moving collection surface comprising means for flash-spinning a polymeric solution to form a plexifilamentary strand entrained in a gaseous stream of a fluid medium. Means are also provided at one location for spreading the strand to form a web and directing the web in a generally vertical plane in a plurality of downward radial directions toward a laydown position on the moving collection surface. Means for charging the web are provided and positioned between the spreading and directing means and the collection surface. The improvement comprises an auxiliary electrostatic field enhancing plate positioned above the web and the moving collection surface and downstream of the laydown position where the web is initially deposited on the collection surface.

The invention provides substantially improved web pinning and uniformity by imposition of the auxiliary electrostatic field in the vicinity of the electrostatic field enhancing plate to force the charged fibrous strands towards the moving collection surface.

BRIEF DESCRIPTION OF THE DRAWINGS

FIG. 3 is a perspective view of a preferred embodiment showing the electrostatic field enhancing plate and an attached curved shield.

FIG. 4 is a computer simulated graph showing the enhanced electric field generated by the inventive apparatus, compared to a prior art apparatus.

DETAILED DESCRIPTION OF THE PREFERRED EMBODIMENTS

Figure 1:
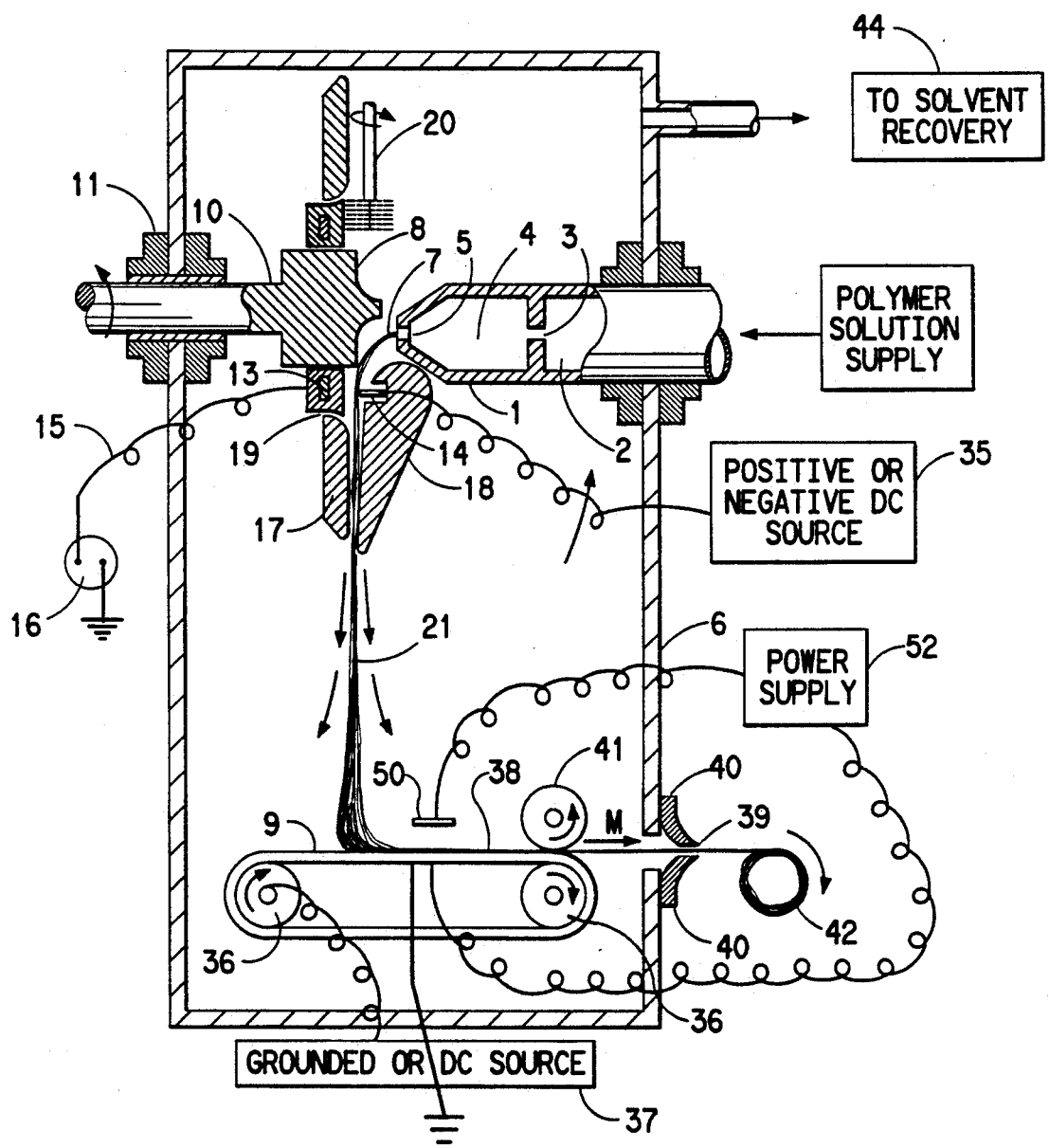
FIG. 1 is a cross-sectional elevation indicating schematically the arrangement of various elements of an apparatus which can be used in the practice of the invention.

Referring now to the figures, wherein like reference numbers indicate like elements, FIG. 1 shows a flash-spinning spinneret device 1 connected to a polymer solution supply source. Polymer solution 2 under pressure is fed through an orifice 3 into intermediate pressure or letdown pressure zone 4 and then through spinning orifice 5 into web forming chamber 6. The extrudate from spinning orifice 5 is a plexifilamentary strand 7. Due to the pressure drop at spinning orifice 5 and the high temperature of the spinning solution, vaporization of solvent (i.e., fluid medium) creates a vapor blast which, by passage along the surface of baffle 8 concomitantly with plexifilament 7, generally follows the path of advance from spinning orifice 5 to collection surface 9, thereby creating a flow pattern within chamber 6 as indicated by the arrows in FIG. 1. Baffle 8 is mounted on shaft 10 which is mounted in bearing 11 and is rotated by means not shown. The surface of baffle 8 is contoured so that the plexifilamentary strand 7 issuing from orifice 5 is deflected into a generally vertical plane and simultaneously spread laterally to form a plexifilamentary web 21 which oscillates from side-to-side as baffle 8 is rotated.

The plexifilamentary web 21 passes from baffle 8 directly into the aerodynamic shield which is comprised of front member 18 and a rear member comprising elements 13 and 17. Multineedle ion gun 14 is mounted on the interior surface of front member 18, and is connected to constant current power source 35 which supplies a potential that depends upon the fluid medium utilized. In the case of trichlorofluoromethane ("CFC-11"), a potential of approximately 50–60 kilovolts (kV) is necessary. A corona discharge occurs between needles 14 and target plate 13 which is disposed so that the vapor blast originating at 5 and deflected by baffle 8 carries the plexifilamentary web along its charging surface. Target plate 13 is connected via commutating ring and brushes to ground by wire 15 and microammeter 16 which indicates target plate current.

Target plate 13 is an annular metal disc electrode, and is preferably covered with a dielectric insulating surface as disclosed in U.S. Pat. No. 3,578,739. Target plate 13 together with concentric annular segment 17 comprise the rear member of the aerodynamic shield, and are adapted to be rotated concentrically with, but independent of, baffle 8 by means not shown. During rotation of the rear member, its interior surface passes by rotating brush 20, driven by means not shown, so that the surface of target plate 13 and adjacent parts may be cleared of any debris, thereby furnishing a continuously cleaned surface for optimum operation of the corona discharge. At intervals, in a circular pattern, the rear shield member is pierced by ports 19 through which ambient gas may be aspirated into the step region between concentric disc segments 13 and 17.

After exiting the aerodynamic shield, plexifilamentary web 21 is deposited upon a moving collection surface 9 by impinging on the collection surface at a fiber deposition point. The collection surface is shown moving in direction M. The surface illustrated is a continuous electrically conductive belt forwarded by drive roll 36. The belt may either be grounded or charged to a positive or negative potential by power source 37. Due to differences in their electrostatic charge, the plexifilamentary web 21 is attracted to collection surface 9 and clings to it in its arranged condition as a swath 38 with sufficient force to overcome the disruptive influences of whatever vapor blast may reach the impingement area.

Figure 2:
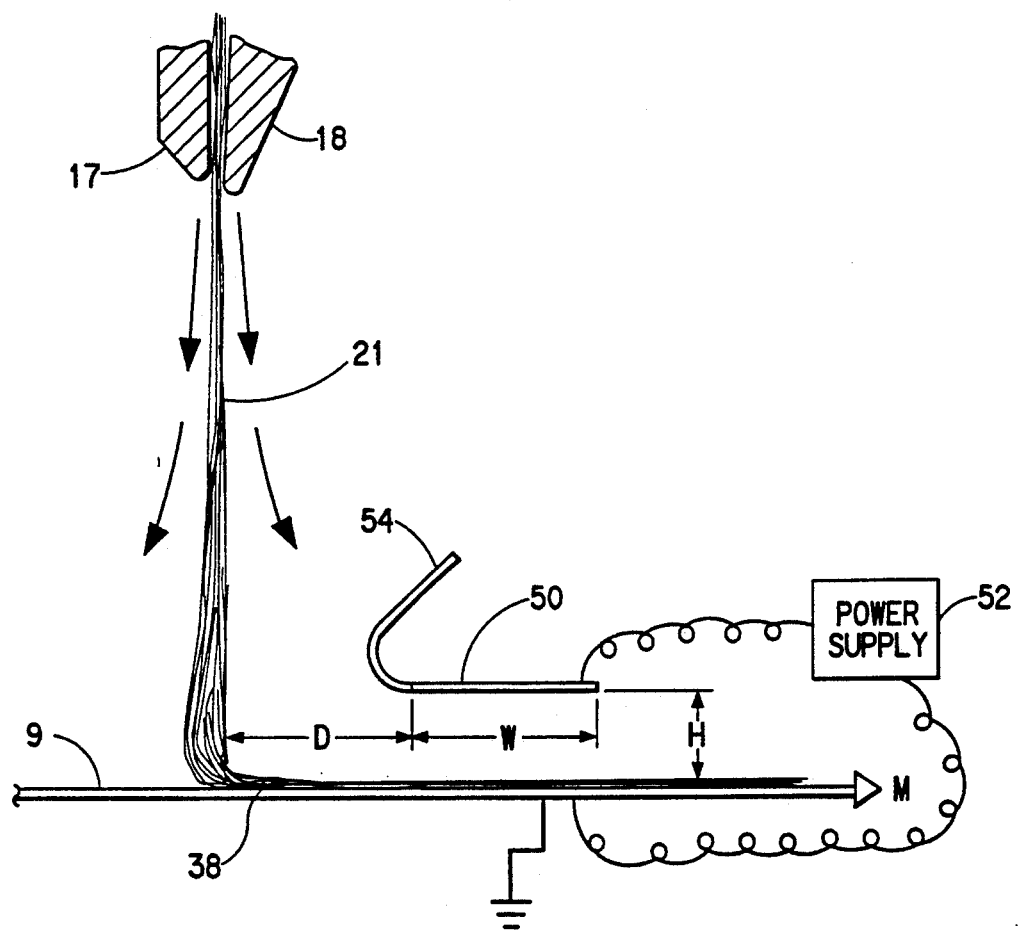
FIG. 2 is an enlarged view of the laydown area of FIG. 1 showing a spread plexifilamentary web, the collection surface, and the electrostatic field enhancing plate.

According to the invention, pinning of the plexifilamentary web 21 to collection surface 9 is enhanced by the electrostatic field generated by auxiliary electrostatic field enhancing plate 50 which is charged by power supply 52. In a preferred embodiment, a curved shield 54 is attached to plate 50 to prevent fibers from depositing on the tip of the plate (see FIGS. 2 and 3). Wide sheets are produced by blending and overlapping the output (i.e., swaths) from several spinning positions placed in an appropriate manner across the width of a receiving surface such as the collection surface 9. The sheet is then lightly compacted by roll 41 and is collected on windup roll 42 after passing through port 39 and flexible elements (or rolls) 40 which assist in retention of vapor within chamber 6. A conventional solvent recovery unit 44 may be beneficially employed for environmental considerations and to improve economic operation.

The inventive apparatus utilizes an electrostatic field enhancing plate 50 positioned above the collection belt and downstream from the fiber deposition point. It will be understood that another electrostatic field enhancing plate 50 (not shown) may be placed slightly upstream of the fiber deposition point to further aid web pinning, however this arrangement is not critical to the invention. This arrangement may be helpful in some operations since the web is directed towards the collection belt on a slight upstream angle to help in web laydown.

In this embodiment, the plate 50 is flat although this is not critical to the invention. Plate 50 should be made of metal (e.g., steel or nickel) or other highly conductive material. Plate 50 is attached to a high electrostatic voltage source 52, which generates voltages of up to 100 kV. Suitable voltage sources include commercial power supplies produced by Del Electronics, Inc. of Mt. Vernon, NY, Glassman High Voltage, Inc. of White Horse Station, NJ or Hipotronics, Inc of Hipo Brew, NY. Preferably, the plate is positioned between about 3 and 10 cm above the collection surface and between about 5 and 10 cm downstream from the fiber deposition point (i.e., laydown position). As shown, the plate can be positioned parallel with the collection surface although it will understood that the plate may also be slightly slanted (e.g., 10 degrees from horizontal).

In a preferred embodiment as shown in more detail in FIG. 3, shield 54 is attached to the leading edge of plate 50. The purpose of shield 54 is to direct the plexifilaments underneath plate 50, and to prevent the plexifilaments from depositing on the tip of the plate. Shield 54 may be made of acrylic resin, polycarbonate resin, or other non-conductive material. Such a suitable acrylic resin material is commercially available from E. I. du Pont de Nemours and Company, Wilimington, Delaware under the trademark "LUCITE®".

The magnitude of the electrostatic field generated by plate 50 will depend on the fluid medium inside the spinning cell, the charge on the fibers, and the aerodynamic forces acting on the fibers. Pinning forces are a product of charge and electrostatic field. Thus, fibers with high charge need less electrostatic field to pin as effectively as fibers with lower charge and high electrostatic field. The strength of the electrostatic field must not exceed the electrostatic breakdown potential of the surrounding fluid medium.

The following is believed to be the most accurate data available for several fluid mediums useful in the invention. For trichlorofluoromethane, known in the trade as CFC-11 and identified in the prior art as a commercial flash spinning agent, the breakdown potential is about 80 kV/cm. For hydrocarbons containing 4 to 6 carbon atoms, such as butane, pentane or hexane, the breakdown potential is about 50 kV/cm. For 2,2-dichloro-1,1,1-trifluoroethane ("HCFC-123") the breakdown potential is about 75 kV/cm, for 2-chloro-1,1,1,2-tetrafluoroethane ("HCFC-124"), the breakdown potential is about 45 kV/cm and for pentafluoroethane ("HFC-125"), the breakdown potential is about 25 kV/cm. Preferably, the impressed electrostatic field will be no greater than about 95% of the breakdown potential of the fluid medium.

As noted before, although the previous description has focused on flash-spinning operations, the process and apparatus of the present invention may also be advantageously applied to any of several fiber-forming processes in which fibers are formed and collected on a moving collection surface to make a fibrous web, for example, by melt-blowing or spunbonded processes. Moreover, it will be understood that spinning orientation is arbitrary and that, as an example, fibers may be deposited horizontally on a vertical collection surface (e.g., some melt-blown processes).

EXAMPLE

The following example is provided for purposes of illustration only and not to limit the invention in any way. FIG. 4 shows the results of a particular computational experiment conducted using a flash-spinning computer study. The lower curve (A) represents the prior art (i.e., the process and apparatus of Brethauer et al., U.S. Pat. Nos. 3,851,023 and 3,860,369) and shows the electrostatic field as a function of distance from a point directly beneath the spinning jet centerline (i.e., below the space defined by the center of elements 17 and 18 of FIG. 1). The upper curve (B) represents the inventive process and apparatus and demonstrates that higher electrostatic fields are generated when a plate (a flat plate in this case) of about 12 inches (30.5 cm) in width (W) and infinite length (L) is positioned about 2 ½ inches (6.4 cm) downstream (D) from the spinning jet centerline and about 3 inches (7.6 cm) above (H) the collection surface, and is charged to an electrostatic potential of about 100 kV (see FIGS. 2 and 3). In both of these curves, the electrostatic field was measured about ½ inch (1.3 cm) above the collection surface.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

We claim:

1. In a process for forming fibrous webs on a moving collection surface that comprises the steps of forming polymeric strands in the fluid medium, directing the strands toward a laydown position on the moving collection surface, electrostatically charging the strands and depositing the strands on the collection surface as a fibrous web, the improvement comprising imposing an auxiliary non-corona electrostatic field of up to 95% of the electrostatic breakdown strength of the fluid medium above the web and the moving collection surface and downstream of the laydown position where the web is deposited on the collection surface to enhance the electrostatic field in the region above the collection surface without the auxiliary field placing a higher electrostatic charge on the web.

2. In a process for forming fibrous sheets on a moving collection surface that comprises the steps of entraining a fibrous web in a gaseous stream of a fluid medium flowing in a generally horizontal path toward one location on a baffle, directing said web and said stream from said one location in a plurality of downward radial directions in a substantially vertical plane through ambient gas toward a laydown position on the moving collection surface, electrostatically charging the web, and collecting said web on said collection surface as a fibrous sheet, the improvement comprising imposing an auxiliary non-corona electrostatic field of up to 95% of the electrostatic breakdown strength of the fluid medium above said web and said moving collection surface and downstream of the laydown position where the web is deposited on the collection surface to enhance the electrostatic field in the region above the collection surface without the auxiliary field placing a higher electrostatic charge on the web.

3. The process of claim 2 wherein the fluid medium comprises trichlorofluoromethane.

4. The process of claim 2 wherein the fluid medium is selected from the group consisting of a hydrocarbon containing between 4 and 6 carbon atoms, methylene chloride, air, a hydrofluorocarbon, a hydrochlorofluorocarbon and mixtures thereof.

5. The process of claim 3 wherein the imposed auxiliary electric field is between about 2 and 80 kV/cm.

6. In an apparatus for forming a fibrous web on a moving collection surface comprising means for forming polymeric strands in a fluid medium, means for directing the strands toward a laydown position on the moving collection surface, and means for charging the strands positioned between the forming and directing means and the collection surface, the improvement comprising an auxiliary non-corona electrostatic field enhancing plate positioned above the web and the moving collection surface and downstream of the laydown position where the web is initially deposited on the collection surface to enhance the electrostatic field in the region above the collection surface without the auxiliary field placing a higher electrostatic charge on the web.

7. In an apparatus for form a flash-spun fibrous web on a moving collection surface comprising means for flash spinning a polymer solution to form a plexifilamentary strand entrained in a gaseous stream of a fluid medium, means for spreading the strand to form a web and directing the web in a generally vertical plane in a plurality of downward radial directions toward a laydown position on the moving collection surface, and means positioned between the spreading and directing means and the collection surface for charging the web, the improvement comprising an auxiliary non-corona electrostatic field enhancing plate positioned above the web and the moving collection surface and downstream of the laydown position where the web is initially deposited on the collection surface to enhance the electrostatic field in the region above the collection surface without the auxiliary field placing a higher electrostatic charge on the web.

8. The apparatus as defined in claim 7 wherein the plate is fabricated of a metal selected from the group consisting of steel and nickel.

9. The apparatus as defined in claim 7 wherein the plate is positioned between about 3 to 10 cm above the collection surface.

10. The apparatus as defined in claim 7 wherein the plate is positioned between about 5 to 10 cm downstream of the laydown position where the web is initially deposited on the collection surface.

* * * * *